(12) United States Patent
Bashir et al.

(10) Patent No.: US 12,116,181 B2
(45) Date of Patent: Oct. 15, 2024

(54) HINGED CONTAINER CAP, CONTAINER ASSEMBLY, AND METHOD FOR MANUFACTURING A HINGED CONTAINER CAP

(71) Applicant: SABIC GLOBAL TECHNOLOGIES B.V., Bergen op Zoom (NL)

(72) Inventors: Zahir Bashir, Trivandrum (IN); Roshan Zameer, Udaya Nagar (IN); Abdulrahman Al-Awwad, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 346 days.

(21) Appl. No.: 17/640,954

(22) PCT Filed: Sep. 11, 2020

(86) PCT No.: PCT/EP2020/075449
§ 371 (c)(1),
(2) Date: Mar. 8, 2022

(87) PCT Pub. No.: WO2021/048336
PCT Pub. Date: Mar. 18, 2021

(65) Prior Publication Data
US 2022/0332477 A1    Oct. 20, 2022

(30) Foreign Application Priority Data

Sep. 12, 2019 (EP) .................................... 19196871

(51) Int. Cl.
*B65D 47/08*    (2006.01)
*B29D 99/00*    (2010.01)
(Continued)

(52) U.S. Cl.
CPC ..... *B65D 47/0838* (2013.01); *B29D 99/0096* (2013.01); *B65D 1/0207* (2013.01); *B65D 43/162* (2013.01); *B29K 2995/0041* (2013.01)

(58) Field of Classification Search
CPC .................. B65D 47/0838; B65D 1/0207; B65D 43/162; B29K 2995/0041; B29L 2031/565; B29C 71/0063
See application file for complete search history.

(56) References Cited

U.S. PATENT DOCUMENTS 4,394,918 A  *  7/1983  Grussen ............. B65D 41/3428
                                                  215/253
4,928,835 A  *  5/1990  Collette .............. B29C 49/6445
                                                  215/42

(Continued)

FOREIGN PATENT DOCUMENTS

JP    H10316154 A   12/1998
JP    2007062745 A   3/2007
(Continued)

OTHER PUBLICATIONS

International Search Report & Written Opinion; International Application No. PCT/EP202020/075449; International Filing Date: Sep. 11, 2020; Date of Mailing: Nov. 26, 2020; 69 pages.

(Continued)

*Primary Examiner* — Ernesto A Grano
(74) *Attorney, Agent, or Firm* — CANTOR COLBURN LLP

(57) ABSTRACT

Hinged container cap, comprising a base portion, a hinge member and a lid, wherein the base portion is made of a crystallisable polymer and includes a base circumferential wall and a base containment wall having an base outlet aperture and has an external base surfaceexternal base surface 44, wherein the hinge member connects the base portion to the lid and allows a movement of the lid between (Continued)

an opened position, in which the base outlet aperture is open, and a closed position, in which the base outlet aperture is closed, wherein in the closed position, at least part of the external base surfaceexternal base surface 44 of the base portion forms an interface with the lid contact surfacelid contact surface 42 of the lid, wherein the base portion and/or of the lid wall is crystallized at at least the interface of the base portion and the lid in the closed position, to allow the lid to be opened after being closed for an elongated period.

23 Claims, 3 Drawing Sheets

(51) Int. Cl.
  *B65D 1/02* (2006.01)
  *B65D 43/16* (2006.01)

(56) References Cited

U.S. PATENT DOCUMENTS

| | | | | |
|---|---|---|---|---|
| 5,662,245 A * | 9/1997 | Grant | ................. | B65D 47/0838 |
| | | | | 222/153.07 |
| 5,673,808 A * | 10/1997 | Valyi | .................. | B65D 41/3409 |
| | | | | 215/252 |
| 6,253,937 B1 * | 7/2001 | Anderson | .......... | B65D 47/0838 |
| | | | | 215/256 |
| 6,971,531 B1 | 12/2005 | Dubach | | |
| 7,527,160 B2 * | 5/2009 | Shingle | ................. | B65D 50/048 |
| | | | | 215/253 |
| 8,596,029 B2 * | 12/2013 | Pedmo | .................... | B67C 3/045 |
| | | | | 53/471 |
| 8,663,412 B2 * | 3/2014 | Detrois | ............. | B29C 66/73921 |
| | | | | 156/308.2 |
| 11,053,060 B2 * | 7/2021 | Giraud | ............... | B65D 83/0805 |
| 2001/0050264 A1 * | 12/2001 | Schorner | ............ | B65D 47/0828 |
| | | | | 215/237 |
| 2009/0223920 A1 * | 9/2009 | Patel | ....................... | B29B 11/08 |
| | | | | 215/45 |
| 2009/0236357 A1 * | 9/2009 | Giraud | ................. | B65D 43/162 |
| | | | | 220/849 |
| 2018/0215532 A1 * | 8/2018 | Kuruvilla | .............. | B65D 43/162 |
| 2022/0340324 A1 * | 10/2022 | Bashir | .................. | B65D 1/0207 |

FOREIGN PATENT DOCUMENTS

| | | |
|---|---|---|
| JP | 2008230617 A | 10/2008 |
| WO | 2013102645 A1 | 7/2013 |
| WO | 2015141494 A1 | 9/2015 |
| WO | 2018141053 A1 | 8/2018 |

OTHER PUBLICATIONS

Anonymous, "Crystallization_of_polymers," Wikipedia, the free encyclopedia. Retrieved from the internet: https://en.wikipedia.org/wiki/Crystallization_of_polymers.

* cited by examiner

HINGED CONTAINER CAP, CONTAINER ASSEMBLY, AND METHOD FOR MANUFACTURING A HINGED CONTAINER CAP

CROSS REFERENCE TO RELATED APPLICATIONS

This application is a National Stage application of PCT/EP2020/075449, filed Sep. 11, 2020, which claims the benefit of European Application No. 19196871.8, filed Sep. 12, 2019, both of which are incorporated by reference in their entirety herein.

BACKGROUND OF THE INVENTION

Field of the Invention

The present invention relates to a hinged container cap, connectable to a container to close an container outlet opening thereof, and comprising a base portion, the base portion is made of a crystallisable polymer material and includes a base circumferential wall for connecting the hinged container cap to the container and a containment wall having an base outlet aperture, for partially closing the container outlet opening when the hinged container cap is connected to the container, wherein the base portion has an external base surfaceexternal base surface (44);

the hinged lid is made of crystallisable polymer material and includes a lid wall being matched to the base portion, and having a lid contact surfacelid contact surface 42 to contact the containment wall and close the base outlet aperture in the closed position of the lid the hinge member connects the base portion to the lid and allows a movement of the lid between an opened position, in which the base outlet aperture is open, and a closed position, in which the base outlet aperture is closed, and wherein in the closed position, at least part of the external base surfaceexternal base surface (44) of the base portion forms an interface with the lid contact surfacelid contact surface 42 of the lid.

The present invention further relates to a container assembly comprising such a hinged container cap.

The invention further relates to a method for the manufacturing of a hinged container cap.

DESCRIPTION OF THE RELATED ART

Commercially available hinged container caps, as e.g. used on bottles for drinks, bottles for detergents/cleaning solutions, containers for candy (e.g. chewing gum or chocolate), and all other kinds of containers for e.g. storing liquids or granular materials, are often made of materials such as polypropylene (PP) or polyolefin (PO).

Furthermore, containers of polyethylene terephthalate (PET) material nowadays have a widespread use. The caps of such containers are however often of a different material, such as PP, PO, or polyethylene (PE). As the cap and the container then must be separated to allow optimal recycling of the container assembly, recycling of such containers is therefore relatively difficult.

International patent publication WO 2013/102645 A1 discloses a packaging comprising a container and a cap, with a hinged lid attached to the cap. At least one of the cap and the container of WO 2013/102645 A1 is made from polyethylene terephthalate (PET).

OBJECT OF THE INVENTION

An object of the invention is to provide an improved hinged container cap. More specifically, it is an object of the invention to provide a commercially useful hinged container cap that does not snap at the hinge due to repeated flexing.

BRIEF SUMMARY OF THE INVENTION

The applicant has found that, when the base containment wall of the base portion, the lid wall of the hinged lid, and the capping pin of the lid are all made of a crystallisable polymer material, and especially when they are all made of PET material, in its amorphous state, "blocking" may occur after an elongated period of time. Blocking refers to a phenomenon that occurs across two smooth polymer surfaces in contact. It is more acute in polymers where the two contacted surfaces are in an amorphous state. It occurs due to interdiffusion of chain segments across two contacting surfaces, especially where the contacting surfaces are amorphous, linear polymers, which can diffuse. This effect is readily noticeable (and generally known to occur) at temperatures above the glass transition temperature (Tg), but also below Tg this effect is noticeable after elongated periods of time, e.g. after a period of longer than a week, such as after several weeks and/or months. Blocking is effectively a form of "cold welding" of two surfaces.

Accordingly, a problem with making PET bottles fitted with integral PET hinge caps are firstly the possibility of blocking or cold welding of the capping pin in the base outlet aperture, thereby making it difficult or impossible to open it and secondly the PET material at the hinge can become brittle and snap off due to repeated bending and opening.

More specifically, when a hinged container cap is entirely made of a polymer in an amorphous state, e.g. amorphous PET, or at least when the containment wall of the base portion, the lid wall of the lid and the capping pin of the lid are all made of a material in its amorphous state, e.g. amorphous PET, and are in contact with each other when the hinged container cap is closed, the polymer chains in the amorphous state slowly diffuse across the contact interfaces, resulting in an increased friction between the lid and the base portion. After an elongated period of being closed, this diffusion results in blocking, which makes it more difficult or even impossible to open the lid again. This is undesired.

A hinged container cap that cannot be opened after it has been closed for an elongated period of time is especially disadvantageous when the hinged container cap is applied on a container to form a container assembly, and when said container assembly contains e.g. consumer goods (e.g. shampoo, liquid soap, drinks, et cetera). For example, when such container assemblies are stored relatively long on e.g. shelves of a store before being sold to a consumer (or e.g. when the consumer stores the container assembly relatively long at home before opening the container assembly), it may then be difficult to get the goods contained in the container assembly out of it, as it is difficult or impossible to open the lid of the cap. A long period of time may be 6 to 9 months, or even years. To produce a container assembly which cannot be opened after being closed for an elongated period of time is of course undesirable.

Accordingly, the hinged container cap according to the invention is characterized in that the crystallisable polymer material of the base portion and/or of the lid wall is crystallized at at least the interface of the base portion and the lid when in the closed position, to allow the lid to be opened after being closed for an elongated period of time.

Advantageously, the invention prevents the above-mentioned undesired effect of blocking by crystallising the base portion and/or the lid wall of the lid at at least the interface of the base portion and the lid when in the closed position or at least said undesired effect of blocking is postponed. This follows from the fact that polymer chains in the crystallised state are locked into crystalline lamellae and hence cannot diffuse or have a very slow diffusion rate (compared with the amorphous state in which diffusion is possible and the diffusion rate is relatively high). At least the blocking effect is less noticeable than compared with contacting parts that are of the same crystallisable polymer material and are both uncrystallised, i.e. amorphous.

In an embodiment, the base containment wall of the base portion may be partially or fully crystalized. In addition, an upper rim of the base circumferential wall adjacent to the base containment wall may be crystallized. The lid may be crystallized at a circumferential edge forming the lid contact surfacelid contact surface 42 with the base portion. Alternatively, or additionally, the lid may be crystallized at an internal surface, including an optional capping pin. The lid may crystallized partially or in full.

As uncrystallised or amorphous polymers tend to be transparent, the invention therefore provides a hinged container cap that can be used with commercial success. That is, opening of hinged container cap is still possible after it has been closed for a prolonged period of time while this is not possible for known hinged container caps.

For example, the internal side wall of the closure and/or the lid wall may be crystallized after the part is made via known methods by heating said surface relatively quickly, such as for 15-90 s, to a temperature of between 80° C. and 250° C. (when the polymer material is PET, for other materials other temperatures may apply) and wait until the material turns opaque (e.g. white). This transformation into the crystallised state may occur faster or slower depending on the used temperature.

Alternatively, the part may be crystallized by cooling it slowly after the material is melted, such as for 10-30 s, e.g. by using hot moulds at 170° C. Again, the transformation into the crystallised state is recognizable by the fact that the material turns opaque (e.g. white), and may take a variable amount of time depending on the starting temperature of the melt and the cooling applied.

PET can also crystallise from the amorphous state by heating between 80-250° C. This is called cold crystallisation. It also crystallises from the melt by cooling between 250-100° C. The fastest crystallisation rate is at 170° C. for PET, whether from the amorphous stare or the melt. One can mould the neck or cap amorphous and post-crystallise it at 170° C., such as for 15-90 s.

Further advantageously, when the hinged container cap is made of a crystallisable polymer material, and used in combination with a container to form a container assembly, and when the container is made of the same material as the hinged container cap, recycling of the container assembly is made much more easy compared with the (present) situation where the cap and the container are often made of two different materials and must be separated before recycling them.

For example, the base containment wall of the base portion and/or the lid wall of the lid may be crystallized after the part is made via known methods by heating said surface relatively quickly to a temperature of between the glass transition temperature and the melt temperature, e.g. approximately between 80° C. and 170° C. when the polymer material is PET, for other materials other temperatures may apply and wait until the material turns opaque (e.g. white). This transformation into the crystallized state may occur faster or slower depending on the used temperature. This transformation need not necessarily affect the entire thickness of the material. The crystallization need only present at the surface of the material being crystallized. Crystallization need only extend to a depth sufficient to impede, restrict or even prevent interdiffusion that contributes to blocking. Thus, a temporary flame-treatment, or temporary exposure to radiation, and/or even a hot air blast, may be sufficient to cause crystallization among the polymers defining one or both of the lid contact surface and the external base surface. As a result, while the formed part may comprise a monolithic polymer, the part is not monolithic in that the crystallinity can vary across thickness, with one surface being defined by essentially amorphous materials, and an opposite surface being defined by and essentially crystalline material, and the material extending between the representing a graded transition between the two states, more simply referred to as a semi-crystalline state, although it bears mentioning that at any instant depth beneath the surface the degree of crystallinity may be different. Thus, in various examples the mating surface has a higher level of crystallinity than the non-mating surface.

As illustrated in the comparative examples below, it is also important to note that a desired decrease in blocking may be achieved by only treating one of two mating surfaces. Thus, one may treat an external base surface and leave the lid in an essentially amorphous state. Likewise, one may treat the lid contact surface and leave the external base surface in an essentially amorphous state.

Alternatively, the part may be crystallized by cooling it slowly after the material is melted. Again, the transformation into the crystallized state is recognizable by the fact that the material turns opaque, and may take a variable amount of time depending on the starting temperature of the melt and the cooling applied. Crystallisation of a crystallisable polymer material is recognizable by the fact that the material, which originally is transparent, becomes translucent or opaque ("turns white"). As set forth above, in various examples a part may be cooled such that it is not crystallized entirely, but only proximal the mating surface (i.e. the lid contact surface 42). As with the base portion, the lid may comprise a thickness across which the crystallinity varies at any given depth. Thus, the mating surface may be more crystalline than a portion below the mating surface, at least to the depth necessary for the crystallinity of the material to impede interdiffusion. Extending further across the thickness, crystallinity can decrease, such that the non-mating surface has less crystallinity than the mating surface, and in some cases is essentially amorphous. In the case of cooling to promote crystallinity, a variety of techniques can be used, such as radiative cooling (e.g., exposing only the mating surface to a lower temperature heat source), convection cooling in gas or liquid (e.g., quenching); or even temporarily coupling the mating surface to a cooled mandrel to transfer heat via conduction. Any one of these modes can give rise to anisotropic crystallinity across the depth of the part (lid and/or base portion).

It is noted that the "closed" position of the hinged container cap refers to the position in which the lid is arranged on the base portion, such that the base outlet aperture of the base portion is closed by the lid. The "open" position of the hinged container cap in contrast refers to the position in which the base outlet aperture is open, and the lid is hinged with respect to the closed position. When the lid 31 is closed to the base portion, the assembly defines an exterior envelope 52. An interior profile of the mated lid 31 and base portion 11 is also defined. It is along this interior profile that the lid 31 and the base portion 11 contact one another and can experience blocking. In other words, an interface between the lid 31 and base portion 11 is present along the interior profile. One can thus heat or cool the interior profile 54 substantially or entirely, which will treat a sufficient portion of the contact interface between the lid 31 and the base portion 11.

It is noted that a "crystallised" state of a crystallisable polymer is relative to the "uncrystallised" or "amorphous" state. Compared with the amorphous state, in the crystallised state a polymer has a more ordered structure. Crystallisable polymers are not either in the "crystallised" or in the "uncrystallised" state, but rather have a degree of crystallisation. In the context of the present invention, a polymer may be in the "crystallised" state when it is treated to obtain a higher degree of crystallisation compared to the normal production process when the polymers are untreated. In the context of the present invention, a polymer may be in the "crystallised" state when the described effect of blocking is prevented or reduced for an elongated period of time. In the context of the present invention, a polymer may be in the "crystallised" state when the material is translucent instead of transparent. PET in particular can be obtained in the uncrystallised (amorphous) state by cooling fast from the melt, or in state of intermediate crystallisation by cooling slowly from the melt. Amorphous PET may be re-crystallised by heating above the Tg (78° C.) for example to 170° C.—this is referred to as cold crystallisation. Another visual difference is that amorphous PET is transparent. The PET that is thermally crystallized from the melt or by cold crystallisation is white. In the context of the present invention, a polymer may be in the "crystallised" state when it is treated to obtain a higher degree of crystallisation compared to the normal production process when the polymers are untreated. In the context of the present invention, a polymer may be in the "crystallised" state when the described effect of blocking is prevented or reduced for an elongated period of time.

It is noted that an "elongated period of time" refers to a period of a least a week, e.g. several weeks, e.g. several months.

The crystallisable polymer may be a thermoplastic material, such as a thermoplastic polyester. In an embodiment, the material of the base portion comprises at least one of the polymers from the list of polyethylene terephthalate homopolymers, polyethylene terephthalate copolymers especially with comonomers such as isophthalic acid and cyclo hexane dimethanol, polyethylene terephthalate with pyromellitic dianhydride (PMDA), polyethylene naphthalate copolymers, polyethylene naphthalate homopolymers, blends of polyethylene terephthalate and polyethylene naphthalate, polyethylene furanoate and its copolymers and blends of polyethylene terephthalate and polyethylene furanoate. The material of the base portion may e.g. comprise mixtures of these materials, or one or more materials of this list with trace amounts of other materials added thereto. Each material of this list is a readily available material, such that a base portion made of such a material may be cheaply produced.

In an embodiment, the material of the base portion comprises at least 80 Wt % polyethylene terephthalate (PET) material, such as at least 95 Wt % of PET material, preferably at least 99 Wt % of PET material. It should be noted that above 15 Wt % comonomer, the PET copolymer is non-crystallisable and permanently amorphous, so no more than 15 Wt % comonomer should be present. In other words, the PET copolymer should be a crystallisable polymer even if it can obtained in the amorphous state. The material of the base portion may e.g. be substantially made of PET material, with trace amounts of other material mixed therewith. Especially PET is a cheap and readily available material, that is already often used in the plastic container manufacturing industry, e.g. to make bottles etc. Even though it is not a common material for (hinged) container caps, changing a production process to manufacture base portions of (hinged) container caps of PET material, or even hinged container caps of PET material, instead of the nowadays common PP is expected to be relatively easy and cost-efficient—while leading to the benefits as described: easier recycling and a see-through cap.

In an embodiment, the material of the lid comprises at least one of the polymers from the list of polyethylene terephthalate homopolymers, polyethylene terephthalate copolymers, polyethylene terephthalate with PMDA, polyethylene naphthalate copolymers, polyethylene naphthalate homopolymers, blends of polyethylene terephthalate and polyethylene naphthalate, polyethylene furanoate and its copolymers, and blends of polyethylene terephthalate and polyethylene furanoate. The material of the lid may e.g. comprise mixtures of these materials, or one or more materials of this list with trace amounts of other materials added thereto. Each material of this list is a readily available, often used material, such that a lid made of such a material may be cheaply produced.

In an embodiment, the material of the lid comprises at least 80 Wt % polyethylene terephthalate (PET) material, such as at least 95 Wt % of PET material, preferably at least 99 Wt % of PET material. The material of the lid may e.g. be substantially made of PET material, with possibly trace amounts of other material mixed therewith. Especially PET is a cheap and readily available material, that is already often used in the plastic container manufacturing industry, e.g. to make bottles etc. Even though it is not a common material for (hinged) container caps, changing a production process to manufacture lids of (hinged) container caps of PET material, or even hinged container caps of PET material, instead of the nowadays common PP is expected to be relatively easy and cost-efficient—while leading to the benefits as described: easier recycling and a see-through cap.

In all embodiments, the PET preferably has an intrinsic viscosity or I.V.>0.55 dL/g. The PET may be virgin or recycled, or a mixture of both.

In a preferred embodiment the base portion of the hinged container cap is made of the same material as the lid of the hinged container cap. More preferably, the base portion, the hinge member and the lid are all made of the same material. Even more preferably, the hinged container cap is made of one material (or the same mixture of materials). In embodiments, the materials of the base portion and the lid, and preferably also of the hinge member, are substantially the same, wherein e.g. only trace amounts, of e.g. less than 5 Wt % or less than 2 Wt %, of components added to the material are different. Recycling can be performed in an efficient manner when the material of the base portion and the lid, and preferably also the hinge member, is the same. Recycling may be especially efficient when the material of a container, on which the hinged container cap is placed, and the hinged container cap itself are made of the same material.

It is noted that even when some components of the hinged container cap are made of a polymer material in its amorphous state and some other components of the container are made of the same polymer material, but in a crystallised state, in the context of the present invention the hinged container cap is made of the "same" material.

In an embodiment, the base portion of the hinged container cap is made of a crystallisable polymer material in its amorphous state, and the lid wall comprises a capping pin, wherein the capping pin and the lid are made of a polymer material in its crystallised state.

At least the surfaces of the lid wall, and optionally the capping pin of the lid that in a closed position of the hinged container cap are in contact with the base containment wall of the base portion, should, in this embodiment, be made of a crystallised polymer material. That is, e.g. the outer surface of the lid (the side that in a closed position is visible for a user) may be made of an amorphous polymer material, while the inner surface of the lid wall, that in a closed position of the hinged container cap is in contact with the base containment wall, may be made of a crystallised polymer material. Advantageously, only the (inner surface of the) lid of the hinged container cap then needs to be crystallized to prevent the effect of blocking, while the other components of the hinged container cap do not need such a treatment. This may result in a relatively cheaper hinged container cap.

If the lid is thin-walled, which in a practical embodiment may be the case, crystallisation of the inner surface of the lid may also result in a crystallisation of the outer surface of the lid.

In an alternative embodiment, the lid of the hinged container cap is made of an un-crystallised, amorphous polymer material, and the base containment wall of the base portion is made of a crystallised polymer material.

At least the surface of the base containment wall of the base portion that in a closed position of the hinged container cap is in contact with the lid of the hinged container cap should in this embodiment be made of a crystallised polymer material. That is, e.g. the outer surface of the base portion (the side that in a opened position of the hinged container cap is visible for a user) may be made of an crystallised polymer material, while the inner surface of the base containment wall, that faces an container outlet opening of a container (when the hinged container cap is mounted on a container), is made of an un-crystallised polymer material. Advantageously, only the (outer surface of the) base containment wall then needs to be crystallized to prevent the effect of blocking, while the other components of the hinged container cap do not need such a treatment. This may result in a relatively cheaper hinged container cap.

If the base containment wall is thin-walled, which in a practical embodiment may be the case, crystallisation of the outer surface of the base containment wall may also result in a crystallisation of the inner surface of the base containment wall. In a further alternative embodiment, both the base containment wall of the base portion, the capping pin of the lid and the lid wall of the lid are all made of a crystallised polymer material. This optimally delays the effect of blocking.

In an embodiment, the degree of crystallinity of the base containment wall of the base portion and/or of the lid wall and/or the capping pin of the lid is at least 30%. As explained, the material of the base portion and/or of the lid may be crystallized even when the degree of crystallisation is below 100%. In embodiments, the degree of crystallisation of the base containment wall of the base portion and/or of the lid wall and the capping pin of the lid is between 30% and 80%, such as between 30% and 50%, preferably between 30% and 40%. The degree of crystallinity may be measured by the Differential Scanning Calorimeter, by X-ray or by density.

In an embodiment, the hinge member is shaped as a bridging element that connects the lid and the base portion, and a groove is arranged in the side of the hinge member that faces away from the lid and the base portion. The applicant has surprisingly found that, if the groove is in contrast arranged at the side of the hinge member that faces towards the lid and the base portion (as is a common practice in hinged container caps made of PP), it is susceptible to snapping off on repeated flexing, during closing and opening of the hole with the pin when it is now made of a material as disclosed herein. This is especially the case when the hinged container cap is made of PET material. In other words, if the hinged container cap is made of a crystallisable polymer material and if the groove is positioned at the side of the hinge member that faces the lid and the base portion, the lid is susceptible to breakage on repeated flexing during capping and uncapping with the pin. However, by placing the groove at the opposite side of the conventional side, i.e. by positioning the groove at the side of the hinge member that faces away from the base portion and the lid, the inventors surprisingly found that the bridging element has flex resistance towards snapping.

When the groove is placed on the side of the hinge member that faces away from the lid and the base portion, the groove is "open" in the closed position of the hinged container cap, and "closed" in the open position of the hinged container cap.

The invention further relates to a container assembly comprising an aforementioned container having an container outlet opening and an aforementioned hinged container cap, with the groove placed on the outer side of the bridge element.

Embodiments described in the above in relation to the hinged container cap may of course also apply to the container assembly.

It is especially advantageous, from the perspective of recycling, if both the hinged container cap and the container are made of the same material, e.g. a material comprising at least 80 Wt % PET.

The invention further relates to a method for manufacturing a hinged container cap, such as an aforementioned hinged container cap, the method comprising the steps of:
  providing a hinged container cap connectable to a container to close an container outlet opening thereof, and comprising a base portion, a hinge member and a lid, wherein:
  the base portion is made of a crystallisable polymer material and includes a base circumferential wall for connecting the hinged container cap to the container and a base containment wall having an base outlet aperture, for partially closing the container outlet opening when the hinged container cap is connected to the container, wherein the base portion has an external base surfaceexternal base surface (44);
  the hinge member connects the base portion to the lid and allows a movement of the lid between an opened position (O), in which the base outlet aperture is open, and a closed position (C), in which the base outlet aperture is closed, and wherein in the closed position, at least part of the external base surfaceexternal base surface (44) of the base portion forms an interface with the lid contact surfacelid contact surface 42 of the lid;
  wherein the lid is made of crystallisable polymer material and includes a lid wall being matched to the base portion and having a lid contact surfacelid contact surface 42 to contact the base containment wall and close the base outlet aperture in the closed position (C) of the lid; characterised in that the method further comprises:

crystallising the crystallisable polymer material of the base portion and/or of the lid wall at least the interface of the base portion and the lid when in the closed position, to allow the lid to be opened after being closed for an elongated period of time.

BRIEF DESCRIPTION OF THE DRAWINGS

The present invention will be explained hereafter with reference to exemplary embodiments of the container assembly according to the invention and with reference to the drawing. Therein.

DETAILED DESCRIPTION

Figure 1:
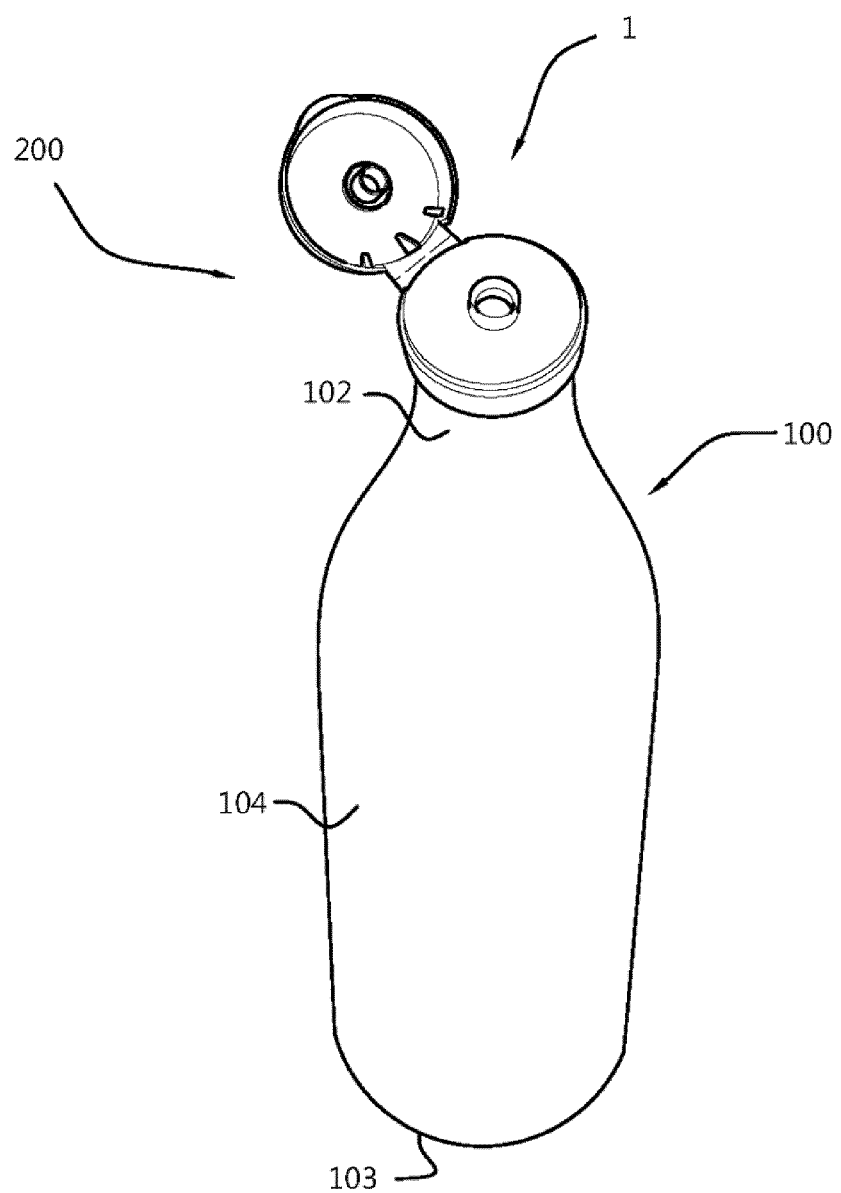
FIG. 1 schematically shows a container assembly according to the present invention, comprising a container and a hinged container cap.
Figure 2:
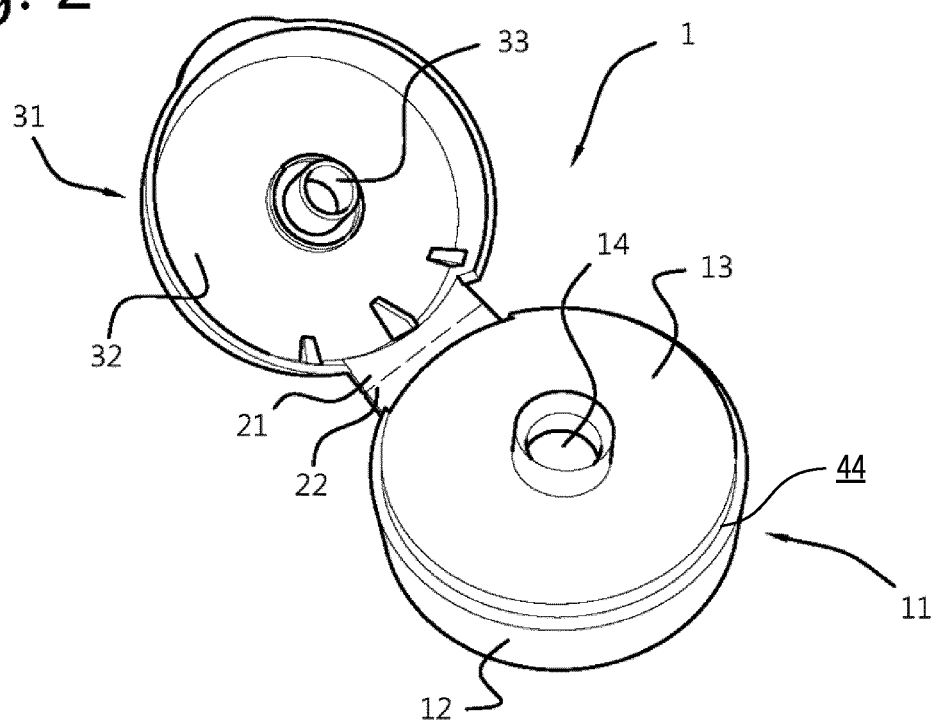
FIG. 2 schematically shows a perspective view of a hinged container cap according to the present invention, in an opened position thereof.
Figure 3:
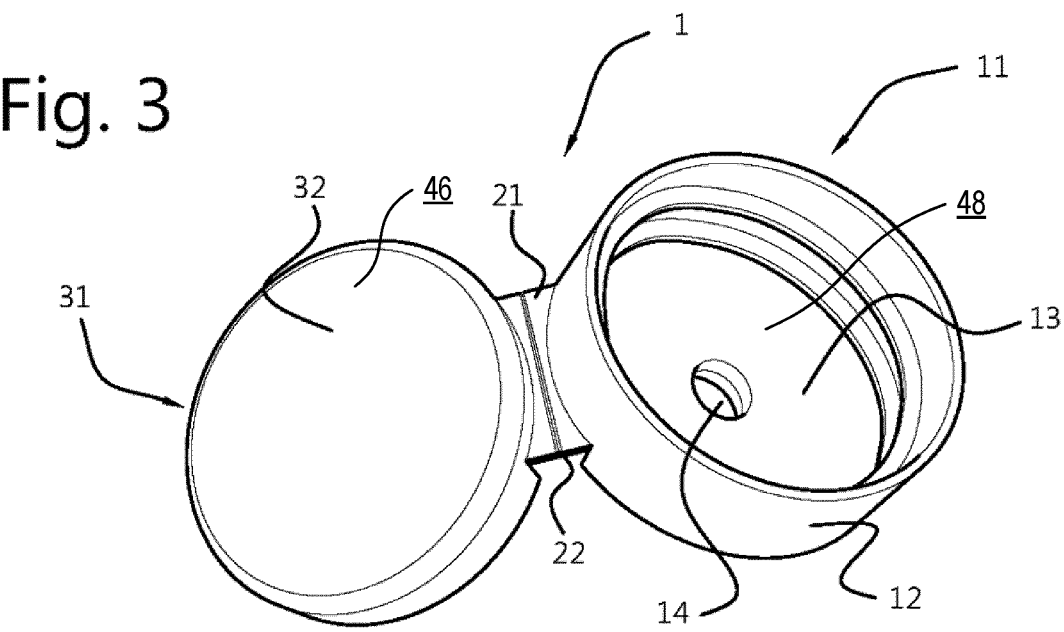
FIG. 3 schematically shows another perspective view of a hinged container cap according to the present invention, in an opened position thereof.

Shown with reference to FIGS. 1-4B is a hinged container cap 1 that is connectable to a container 100 to close an container outlet opening 101 of the container. The hinged container cap 1 as shown is configured for use with e.g. shampoo bottles. In FIGS. 2 and 3 the hinged container cap 1 is suitable to be connected to a container, whereas in FIG. 1 the hinged container cap 1 is connected to container 100 to form a container assembly 200.

The hinged container cap 1 comprises at least a base portion 11, a hinge member 21 and a lid 31.

The base portion 11 is made of a crystallisable polymer material, e.g. a crystallisable thermoplastic, such as a thermoplastic polyester, including at least one of the polymers from the list of polyethylene terephthalate homopolymers, polyethylene terephthalate copolymers, polyethylene terephthalate with PMDA, polyethylene naphthalate copolymers, polyethylene naphthalate homopolymers, blends of polyethylene terephthalate and polyethylene naphthalate, polyethylene furanoate and its copolymers and blends of polyethylene terephthalate and polyethylene furanoate or mixtures thereof. Preferably, the base portion 11 is made of PET material, e.g. comprising at least 50 Wt % of PET material, such as at least 80 Wt % or more. Preferably the base portion 11 is made of one material or of one material mixture, such that the chemical composition of the base portion 11 is uniform. Preferably, the material of the base portion 11 is the same as the material of the lid 31. More preferably, the material of the base portion 11 is the same as the material of the lid 31 and the hinge member 21. The base portion 11 is typically a conically shaped pin with a taper, having a small diameter near the top of the base portion 11, which diameter increases towards the bottom of the base portion 11.

Preferably, the base portion 11 is made of a transparent crystallisable polymer material.

The base portion 11 includes a base circumferential wall 12 for connecting the hinged container cap 1 to the container 100. As visible in FIG. 1, the container 100 may e.g. comprise a neck portion 102 near the top thereof, a bottom 103 and a body 104. Preferably, the neck portion 102 is relatively rigid, e.g. by being made of a somewhat thicker material than the body 104 of the container 100.

Figure 4A:
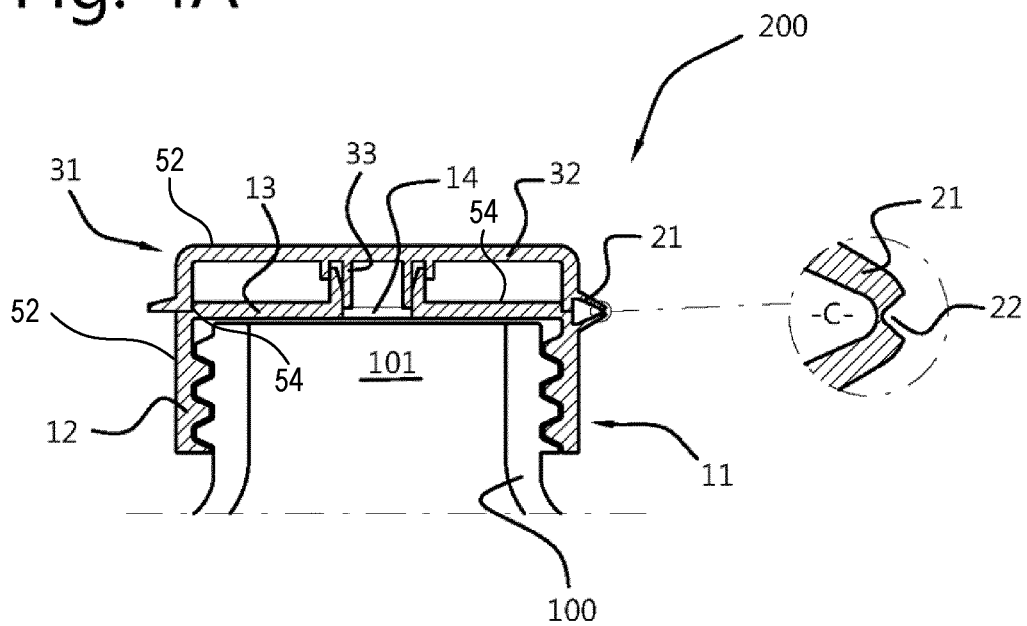
FIG. 4A schematically shows a cross-sectional view of a hinged container cap according to the present invention, in a closed position thereof.
Figure 4B:
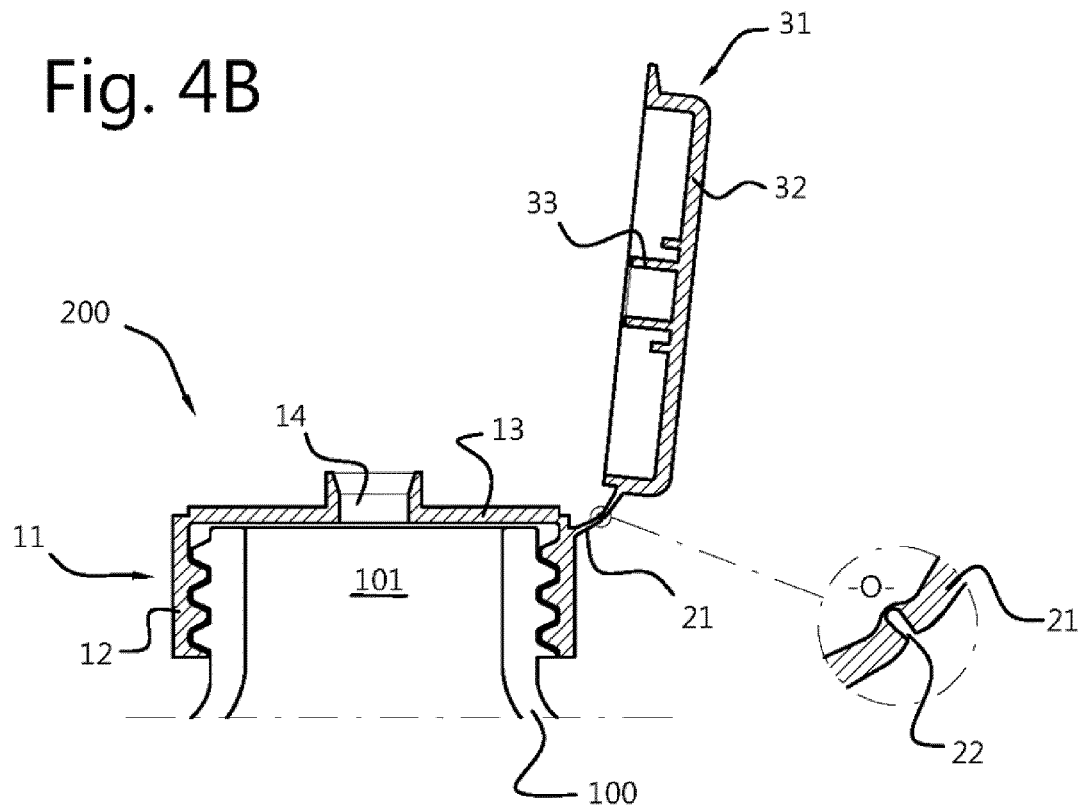
FIG. 4B schematically shows a cross-sectional view of a hinged container cap according to the present invention, in an opened position thereof.

As shown in FIGS. 1, 4A and 4B, the base circumferential wall 12 of the base portion 11 is preferably slightly larger than the neck portion 102 of the container 100, allowing to place the base portion 11 of the hinged container cap 1 on the neck portion 102 of the container 100. The hinged container cap 1 may e.g. be connected on the container 100 by shrink-fitting the base circumferential wall 12 on the neck portion 102. Other methods to connect the base circumferential wall 12 to the neck portion 102 are however also known, e.g. by snap-fitting or using screw thread.

The base portion 11 further comprises a base containment wall 13 having an base outlet aperture 14, for partially closing the container outlet opening 101 when the hinged container cap 1 is connected to the container 100. The base containment wall 13 of the cap assembly contains or restricts the contents from pouring out in an uncontrolled manner. By the wording "partially closing" it is meant that the base containment wall 13 effectively reduces the size of the container outlet opening 101 of the container 100. The size of the base outlet aperture 14 of the hinged container cap 14 is smaller than the size of the container outlet opening 101 of the container 100. So, contents of the container 100 may still be able to exit the container 100 when the hinged container cap 1 is placed on the container 100, but the effective size of the outlet is reduced. In other words, the base containment wall 13 restricts flow of the contents of the container 100 through the container outlet opening 101 of the container 101. The containment wall 13 forces the contents to go through the base outlet aperture 14 of the hinged container cap 1.

The hinge member 21 of the hinged container cap 1 connects the base portion 11 to the lid 31 and allows a movement of the lid 31 between an opened position O, and a closed position C. In the opened position O the base outlet aperture 14 of the hinged container cap 1 is open, in the closed position C the base outlet aperture 14 of the hinged container cap is closed.

Many types of hinge members 21 are known, and the invention is not limited to a particular type. That is, any type of hinge member 21 may be used in the context of the present invention. One often-used hinge member 21 is a so-called butterfly hinge. However, also hinge members wherein the lid rotates about a substantially horizontal axis (as e.g. disclosed in WO 2013/102645 A1) are well known, as well as many other types of hinges members.

As visible with respect to FIGS. 2-4B, the hinge member 21 may be shaped as a bridging element, the bridging element connecting the lid 31 and the base portion 11. A groove 22 may be arranged in the bridging element, in the side of the hinge member 21 that faces away from the lid 31 and the base portion 11. As visible in FIG. 1, in the opened position O of the hinged container cap 1 the groove 22 may be closed. As visible in FIG. 4A, in the closed position C of the hinged container cap 1 the groove 22 may be opened, whereas, as visible in FIG. 4B, in the open position O of the hinged container cap 1 the groove 22 may be closed.

The hinge member 21 may be made of a crystallisable polymer material, e.g. a crystallisable thermoplastic, such as a thermoplastic polyester, including at least one of the polymers from the list of polyethylene terephthalate homopolymers, polyethylene terephthalate copolymers, polyethylene terephthalate with PMDA, polyethylene naphthalate copolymers, polyethylene naphthalate homopolymers, blends of polyethylene terephthalate and polyethylene naphthalate, polyethylene furanoate and its copolymers and blends of polyethylene terephthalate and polyethylene furanoate or mixtures thereof. Preferably, the hinge member 21 is made of PET material, e.g. comprising at least 50 Wt % of PET material, such as at least 80 Wt % or more. Preferably the hinge member 21 is made of one material or of one material mixture, such that the chemical composition of the hinge member 21 is uniform. Preferably, the material of hinge member 21 is the same as the material of the lid 31 and/or the base portion 11. Preferably, the hinge member 21 is made of a transparent crystallisable polymer material.

The lid 31 of the hinged container cap 1 is made of a crystallisable polymer material, e.g. a crystallisable thermoplastic, such as a thermoplastic polyester, including at least one of the polymers from the list of polyethylene terephthalate homopolymers, polyethylene terephthalate copolymers, polyethylene terephthalate with PMDA, polyethylene naphthalate copolymers, polyethylene naphthalate homopolymers, blends of polyethylene terephthalate and polyethylene naphthalate, polyethylene furanoate and its copolymers and blends of polyethylene terephthalate and polyethylene furanoate or mixtures thereof. Preferably, the lid 1 is made of PET material, e.g. comprising at least 50 Wt % of PET material, such as at least 80 Wt % or more. Preferably the lid 1 is made of one material or of one material mixture, such that the chemical composition of the lid 1 is uniform. Preferably, the material of the lid 1 is the same as the material of the base portion 11. More preferably, the material of the lid 31 is the same as the material of the base portion 11 and the hinge member 21. Preferably, the lid 1 is made of a transparent crystallisable polymer material.

The lid 31 includes a lid wall 32 and a capping pin 33. Preferably, the circumference of the lid wall 32 of the lid 31 substantially matches the circumference of the base circumferential wall 12 of the base portion 11, such that the outer surface of the hinged container cap 1 is relatively smooth when the hinged container cap 1 is closed. The capping pin 33 protrudes with respect to the lid wall 32, as is well visible in FIG. 2. The capping pin 33 is matched to the base portion 11: in the closed position C of the lid 31, see FIG. 4A, the capping pin 33 closes the base outlet aperture 14 of the base portion. It should be noted, however, that the hinged container cap 1 as shown in FIGS. 1-4B is configured for use with e.g. shampoo bottles. Embodiments are foreseen and within the scope of the present invention, however, wherein the capping pin 33 in the hinged upper part of the assembly is omitted, i.e. embodiments wherein the hole 14 essentially radially extends up until the base circumferential wall 12 to form a much larger hole 14, which means the base containment wall 13 is smaller or absent in FIG. 2. e.g. for use with drinking bottles. This much larger hole 14 is then to be fully covered by the lid 31 and lid wall 32.

As further visible in FIG. 4A, at least the materials of the base containment wall 13 of the base portion 11, the capping pin 33 of the lid 31 and the lid wall 32 of the lid 31 are in contact with each other in the closed position C of the hinged container cap 1.

At least one of the material of the base containment wall 13 and the material of the lid wall 32 and the capping pin 33 is crystallised. That is, the material of the base containment wall 13 of the base portion 11 is crystallised, or the material of the lid wall 32 and the capping pin 33 of the lid 31 are crystallised, or the material of the base containment wall 13 of the base portion 11 and the material of the lid wall 32 and the capping pin 33 of the lid 31 are all crystallised. This crystallisation allows the lid 31 to be opened after being closed for an elongated period of time. In other words, this crystallisation prevents or at least reduces the effect of blocking of the materials of the lid 31 and the base portion 11.

The degree of crystallinity of the crystallised surface may be between 10% and 80%, e.g. between 30% and 80%, such as between 30% and 40%.

COMPARATIVE EXAMPLE (CE) AND EXAMPLES

In the example below Coefficient of Friction ("CoF") tests have been carried out to show proof of concept using analytical methods. A measurement of the normal force needed to separating two contacted sheets was also made.

In these tests, there is a base amorphous PET sheet. On top of this amorphous PET sheet, a crystallised PET sheet (the sliding PET sheet) was placed, and the frictional load on sliding the top sheet relative to the bottom, was measured. The crystallised PET was prepared from the amorphous PET sheet by cold crystallisation above the Tg. In the example PET sheet samples with different cold crystallisation temperatures have been studied.

The sliding PET sheet samples were prepared by annealing the amorphous sheet at different temperatures—80° C., 110° C., 140° C. and 170° C. (Tc in Table 1). The last three sheets turned translucent or opaque indicating they had crystallised, while the 80° C. treatment left the sheet transparent indicating it had not crystallised.

The base sheet sample used was a PET sheet without any crystallisation preparation. To accelerate the diffusion process, both the base and sliding sheet samples were sandwiched with a 200 g weight on top and kept in the oven at 80° C. for 3 hours. 80° C. was selected as it was just above the glass transition of PET (78° C.), so that it would speed up diffusion across the interface of the two films, but the temperature was too low to cause cold crystallisation even after 3 h. For the CE, the top sheet and bottom sheet were exposed to 80° C. for 3 h, but they did not crystallise as evidenced by the fact that they remained transparent; the amorphous-amorphous sandwich was then removed and the sliding friction at room temperature was determined. The amorphous-crystalline sandwich sheets of Examples 1-3, were likewise kept with the weight at 80° C. for 3 h to aid diffusion across the interface between the amorphous base sheet and the crystallised top sheet. After this the sandwiches were removed and the sliding friction at room temperature was determined. Below are the CoF results:

TABLE 1

| Example | Sliding sheet Tc (° C.) | Static CoF | Kinetic CoF | Load (N) |
|---|---|---|---|---|
| Comparative Example | 80 | 4.21 | 0.22 | 8.9 |
| Example 1 | 110 | 0.28 | 0.17 | 0.3-0.4 |
| Example 2 | 140 | 0.19 | 0.17 | 0.3-0.4 |
| Example 3 | 170 | 0.15 | 0.14 | 0.3-0.4 |

It can be noticed that the static CoF and load needed to separate the sheets is relatively high with the Comparative Example, as both top and bottom sheets were in the amorphous state and diffusion across the interface was substantial after 3 hours at 80° C. The high CoF of the amorphous-amorphous sandwich correlates with blocking. Whereas with Examples 1-3 where the top sheets were crystallized at higher temperatures, the CoF values reduced significantly. Likewise, the normal force needed to separate the sheets by pulling shows the same trend. The amorphous-amorphous sheet sandwich of the Comparative Example requires a large force to pull apart, more than 10×, than is needed to pull apart the amorphous-crystalline pairs of Examples 1-3. This is because cold welding through diffusion occurred in the amorphous-amorphous pair, but not in the amorphous-crystalline pairs. These results prove the concept of the invention, which is about creating an amorphous-crystalline interface between two PET parts would reduce blocking.

In practice, it may take weeks for blocking to happen as the application shall be below the Tg in service conditions. Thus the optimum solution range in terms of crystallisation temperature and moulding process conditions can be arrived at based on actual moulded samples. The mould therein is preferably designed in such a way that only the surfaces to be crystallized are exposed to the stated crystallisation temperatures, e.g. 170° C.

LIST OF REFERENCE NUMERALS

1—hinged container cap
11—base portion
12—base circumferential wall
13—base containment wall
14—base outlet aperture
21—hinge member
22—groove
31—lid
32—lid wall
33—capping pin
42—lid contact surface
44—external base surface
46—lid outer surface
48—base portion inner surface
52—exterior envelope
54—interior profile
100—container
101—container outlet opening
102—neck portion
103—bottom
104—body
200—container assembly

The invention claimed is:

1. A hinged container cap, connectable to a container to close a container outlet opening thereof, and comprising a base portion, a hinge member and a lid, wherein:

the base portion is made of a crystallisable polymer material and includes a base circumferential wall to connect the hinged container cap to the container and a base containment wall having a base outlet aperture, for partially closing the container outlet opening when the hinged container cap assembly is connected to the container, wherein the base portion has an external base surface;

the lid is made of crystallisable polymer material and includes a lid wall being shaped to match to the base portion and having a lid contact surface to contact the base containment wall and close the base outlet aperture in the closed position of the lid;

the hinge member connects the base portion to the lid and allows a movement of the lid between an opened position, in which the base outlet aperture is open, and a closed position, in which the base outlet aperture is closed, and wherein in the closed position, at least part of the external base surface of the base portion forms an interface with the lid contact surface of the lid; and wherein the crystallisable polymer material of the base portion and/or of the lid wall is crystallized proximal the interface of the base portion and the lid when in the closed position, to allow the lid to be opened after being closed for an elongated period of time, such that a portion of the polymer comprising the lid that defines the lid contact surface has a higher degree of crystallinity than another portion of the polymer comprising the lid that defines a lid outer surface and/or a portion of the polymer comprising the base portion that defines the external base surface has a higher degree of crystallinity than another portion of the polymer comprising the base portion that defines a base portion inner surface.

2. The hinged container cap according to claim 1, wherein the material of the base portion comprises at least one of the polymers from the list of polyethylene terephthalate homopolymers, polyethylene terephthalate copolymers, polyethylene terephthalate with pyromellitic dianhydride, polyethylene naphthalate copolymers, polyethylene naphthalate homopolymers, blends of polyethylene terephthalate and polyethylene naphthalate, polyethylene furanoate and its copolymers, and blends of polyethylene terephthalate and polyethylene furanoate.

3. The hinged container cap according to claim 2, wherein the material of the base portion comprises at least 80 Wt % of a polyethylene terephthalate material.

4. The hinged container cap according to claim 1, wherein the material of the lid comprises at least one of the polymers from the list of polyethylene terephthalate homopolymers, polyethylene terephthalate copolymers, polyethylene terephthalate with pyromellitic dianhydride, polyethylene naphthalate copolymers, polyethylene naphthalate homopolymers, blends of polyethylene terephthalate and polyethylene naphthalate, polyethylene furanoate and its copolymers, and blends of polyethylene terephthalate and polyethylene furanoate.

5. The hinged container cap according to claim 4, wherein the material of the lid comprises at least 80 Wt % polyethylene terephthalate material.

6. The hinged container cap according to claim 1, wherein the material of the lid and the base portion is the same.

7. The hinged container cap according to claim 6, wherein the material of the hinge member is the same as the material of the lid and the base portion.

8. The hinged container cap according to claim 1, wherein the base portion is made of an amorphous polymer material, wherein the lid wall includes a capping pin and wherein the lid wall and the capping pin of the lid are made of a crystallised polymer material.

9. The hinged container cap according to claim 1, wherein the lid is made of an amorphous polymer material, and wherein the base containment wall of the base portion is made of a crystallised polymer material.

10. The hinged container cap according to claim 1, wherein the degree of crystallinity of the base containment wall and/or of the lid wall is at least 30%.

11. The hinged container cap according to claim 1, wherein the hinge member is shaped as a bridging element that connects the lid and the base portion, and wherein a groove is arranged in the side of the hinge member that faces away from the lid and the base portion.

12. The hinged container cap according to claim 1, wherein the hinged container cap is made of a transparent crystallisable polymer material.

13. A container assembly comprising a container having a container outlet opening and a hinged container cap according to claim 1.

14. The container assembly according to claim 13, wherein the container and the hinged container cap are each made of a material that comprises at least 80 Wt % polyethylene terephthalate.

15. A method for manufacturing a hinged container cap, the method comprising the steps of:
providing a hinged container cap connectable to a container to close a container outlet opening thereof, and comprising a base portion, a hinge member and a lid, wherein:
the base portion is made of a crystallisable polymer material and includes a base circumferential wall for connecting the hinged container cap to the container and a base containment wall having a base outlet aperture, for partially closing the container outlet opening when the hinged container cap is connected to the container, wherein the base portion has an external base surface;
the hinge member connects the base portion to the lid and allows a movement of the lid between an opened position, in which the base outlet aperture is open, and a closed position, in which the base outlet aperture is closed, and wherein in the closed position, at least part of the external base surface of the base portion forms an interface with the lid contact surface of the lid;
wherein the lid is made of crystallisable polymer material and includes a lid wall being matched to the base portion and having a lid contact surface lid contact surface to contact the base containment wall and close the base outlet aperture in the closed position of the lid;
wherein the method further comprises crystallising the crystallisable polymer material of the base portion and/or of the lid wall at least the interface of the base portion and the lid such that a portion of the polymer comprising the hinged container cap that defines an exterior envelope of a closed hinged container cap has a lower degree of crystallinity than a portion of the polymer comprising the hinged container cap that has defines an interior profile of a closed hinged container cap.

16. The container assembly according to claim 13, wherein the hinged container cap and the container are made of the same material.

17. The hinged container cap according to claim 2, wherein the material of the base portion comprises at least 95 Wt % of the polyethylene terephthalate material.

18. The hinged container cap according to claim 1, wherein the degree of crystallinity of the base containment wall and the degree of crystallinity of the lid wall are both at least 30%.

19. The hinged container cap according to claim 1, wherein the degree of crystallinity of the base containment wall of the base portion, the lid wall, and the capping pin of the lid is between 30% and 80%.

20. A hinged container cap, connectable to a container to close a container outlet opening thereof, and comprising a base portion, a hinge member and a lid, wherein:
the base portion is made of a crystallisable polymer material and includes a base circumferential wall to connect the hinged container cap to the container and a base containment wall having a base outlet aperture, for partially closing the container outlet opening when the hinged container cap assembly is connected to the container, wherein the base portion has an external base surface;
the lid is made of crystallisable polymer material and includes a lid wall being shaped to match to the base portion and having a lid contact surface to contact the base containment wall and close the base outlet aperture in the closed position of the lid;
the hinge member connects the base portion to the lid and allows a movement of the lid between an opened position, in which the base outlet aperture is open, and a closed position, in which the base outlet aperture is closed, and wherein in the closed position, at least part of the external base surface of the base portion forms an interface with the lid contact surface of the lid; and
wherein the crystallisable polymer material of the base portion and/or of the lid wall is crystallized proximal the interface of the base portion and the lid when in the closed position, to allow the lid to be opened after being closed for an elongated period of time, such that a portion of the polymer comprising the lid that defines the lid contact surface has a higher degree of crystallinity than another portion of the polymer comprising the lid that defines a lid outer surface and/or a portion of the polymer comprising the base portion that defines the external base surface has a higher degree of crystallinity than another portion of the polymer comprising the base portion that defines a base portion inner surface;
wherein the material of the base portion comprises at least one of the polymers from the list of polyethylene terephthalate homopolymers, polyethylene terephthalate copolymers, polyethylene terephthalate with pyromellitic dianhydride, polyethylene naphthalate copolymers, polyethylene naphthalate homopolymers, blends of polyethylene terephthalate and polyethylene naphthalate, polyethylene furanoate and its copolymers, and blends of polyethylene terephthalate and polyethylene furanoate; and
wherein the material of the lid comprises at least one of the polymers from the list of polyethylene terephthalate homopolymers, polyethylene terephthalate copolymers, polyethylene terephthalate with pyromellitic dianhydride, polyethylene naphthalate copolymers, polyethylene naphthalate homopolymers, blends of polyethylene terephthalate and polyethylene naphthalate, polyethylene furanoate and its copolymers, and blends of polyethylene terephthalate and polyethylene furanoate.

21. The hinged container cap of claim 20, wherein the base portion is made of an amorphous polymer material, the lid wall includes a capping pin and the lid wall and the capping pin of the lid are made of a crystallised polymer material; or wherein the lid is made of an amorphous polymer material, and the base containment wall of the base portion is made of a crystallised polymer material.

22. A container assembly comprising a container having a container outlet opening and a hinged container cap according to claim 20.

23. The method of claim 15, wherein the material of the base portion comprises at least one of the polymers from the list of polyethylene terephthalate homopolymers, polyethylene terephthalate copolymers, polyethylene terephthalate with pyromellitic dianhydride, polyethylene naphthalate copolymers, polyethylene naphthalate homopolymers, blends of polyethylene terephthalate and polyethylene naphthalate, polyethylene furanoate and its copolymers, and blends of polyethylene terephthalate and polyethylene furanoate; and wherein the material of the lid comprises at least one of the polymers from the list of polyethylene terephthalate homopolymers, polyethylene terephthalate copolymers, polyethylene terephthalate with pyromellitic dianhydride, polyethylene naphthalate copolymers, polyethylene naphthalate homopolymers, blends of polyethylene terephthalate and polyethylene naphthalate, polyethylene furanoate and its copolymers, and blends of polyethylene terephthalate and polyethylene furanoate.

* * * * *